(12) United States Patent
Goujon et al.

(10) Patent No.: US 7,590,028 B2
(45) Date of Patent: Sep. 15, 2009

(54) SEABED SEISMIC CABLES AND METHODS OF STABILIZING SAME WHEN DEPLOYED ON A SEABED

(75) Inventors: Nicolas Goujon, Oslo (NO); Martin Howlid, Slependen (NO)

(73) Assignee: WesternGeco L.L.C., Houston, TX (US)

( * ) Notice: Subject to any disclaimer, the term of this patent is extended or adjusted under 35 U.S.C. 154(b) by 114 days.

(21) Appl. No.: 11/128,044

(22) Filed: May 12, 2005

(65) Prior Publication Data

US 2006/0256661 A1 Nov. 16, 2006

(51) Int. Cl.
*G01V 1/38* (2006.01)

(52) U.S. Cl. .......................................... 367/17; 367/20

(58) Field of Classification Search .................. 367/17, 367/20

See application file for complete search history.

(56) References Cited

U.S. PATENT DOCUMENTS

| | | | | |
|---|---|---|---|---|
| 3,176,646 | A | * | 4/1965 | Natwick et al. ............. 114/243 |
| 3,352,274 | A | * | 11/1967 | Clakins ....................... 114/243 |
| 3,440,991 | A | * | 4/1969 | Cubbage ..................... 114/243 |
| 3,440,993 | A | * | 4/1969 | Taylor, Jr. et al. ........... 114/243 |
| 3,611,976 | A | | 10/1971 | Hale et al. |
| 3,660,809 | A | * | 5/1972 | Pearson ....................... 367/152 |
| 3,975,980 | A | | 8/1976 | Hood |
| 4,190,012 | A | | 2/1980 | Rispin et al. |
| 4,241,427 | A | * | 12/1980 | Swenson ...................... 367/20 |
| 4,542,708 | A | | 9/1985 | Holcombe et al. |
| 4,756,270 | A | | 7/1988 | Boscov |
| 4,979,150 | A | * | 12/1990 | Barr ............................. 367/24 |
| 5,365,491 | A | | 11/1994 | Sullivan et al. |
| 6,021,091 | A | * | 2/2000 | Gaiser ........................ 367/20 |
| 6,244,204 | B1 | | 6/2001 | Weyman |
| 6,257,161 | B1 | * | 7/2001 | Lindeman et al. ........... 114/243 |
| 6,288,972 | B1 | | 9/2001 | Norris |
| 6,846,133 | B2 | * | 1/2005 | Martin et al. ............... 405/160 |
| 7,066,687 | B2 | * | 6/2006 | Martin et al. ............... 405/160 |
| 2002/0062777 | A1 | * | 5/2002 | Barker ........................ 114/243 |
| 2003/0159877 | A1 | * | 8/2003 | Martin et al. ............... 181/110 |
| 2004/0035349 | A1 | * | 2/2004 | Barker ........................ 114/243 |
| 2006/0117874 | A1 | * | 6/2006 | Goujon et al. ............. 73/866.1 |
| 2006/0245300 | A1 | * | 11/2006 | De Kok et al. ................ 367/15 |
| 2007/0056384 | A1 | * | 3/2007 | Yung et al. .................... 73/807 |

FOREIGN PATENT DOCUMENTS

EP 1 058 130 A2 12/2000

(Continued)

OTHER PUBLICATIONS

Caldwell, "Shear waves shine brightly," Oilfield Review, pp. 2-15, 1999.

(Continued)

*Primary Examiner*—Eric Bolda
(74) *Attorney, Agent, or Firm*—Jeffrey A. Pyle; Richard V. Wells; Jeffrey E. Griffin (57) ABSTRACT

Apparatus and methods for acquiring seismic data using a seabed seismic data cable positioned on a seabed are described, including controlling effect of water flow on the cable during data acquisition using fairing elements, which may be caused to extend from the cable generally transversely as water flows past the cable. Alternate paths for water underneath the cable may also be provided, reducing lift forces on the cable. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 CFR 1.72(b).

7 Claims, 6 Drawing Sheets

FOREIGN PATENT DOCUMENTS

| | | |
|---|---|---|
| EP | 1 058 130 A3 | 4/2004 |
| GB | 2439101 A * | 12/2007 |
| JP | 5-144327 | 6/1993 |
| RU | 1792808 A1 * | 2/1993 |
| WO | WO 02/14905 A1 | 2/2002 |

OTHER PUBLICATIONS

UK Search Report dated Sep. 21, 2006, for Application No. GB 0611652.9.

South Bay Cable Corporation, (n.d.). Fairing. Retrieved Feb. 7, 2005, from South Bay Cable Corporation Web site: http://www.southbaycable.com/products5.html.

Dynex, (n.d.). Dynex 75 for marine geological seismic surveys.

Cortland Cable, (n.d.). Hair fairing. Retrieved Feb. 4, 2005, from Cortland Cable Web site: www.thecortlandcompanies.com.

ROV Committee of the Marine Technology Society, (n.d.). Drag. Retrieved Feb. 4, 2005, from ROV Committee of the Marine Technology Society Web site: http://www.rov.org/educational/pages/Drag.html.

"Specification for an Acoustic Projection System for Active Measurements", Department of Defense (2000).

USPTO Board of Appeals Decision 2004-2324 on WG U.S. Appl. No. 10/266,852 (Glen Barker), drawn to a "marine fairing" having a leading edge and a tail portion, the fairing made from a material having a specific gravity of approximately 1.0 to 1.2 gr/cc.

* cited by examiner

SEABED SEISMIC CABLES AND METHODS OF STABILIZING SAME WHEN DEPLOYED ON A SEABED

BACKGROUND OF THE INVENTION

1. Field of Invention

The present invention relates generally to the field of seismic data acquisition, and particularly to cables adapted to lie on a seabed and methods of stabilizing them when exposed to currents.

2. Related Art

Marine seismic exploration investigates and maps the structure and character of subsurface geological formations underlying a body of water. In so-called seabed seismic, a cable containing seismic receivers is deployed onto the seabed from a surface vessel. Older ocean bottom cables were comprised only of a hydrophone and a vertically oriented geophone strapped to the outside. More recent versions of seismic seabed cables typically comprise an instrumented cable packed with receivers, similar to the streamers that are towed in conventional marine surveys, but designed to operate on the seafloor. One seabed cable, known under the trade designation "NESSIE 4C", available from WesternGeco LLC, Houston, Tex., contains multiple sensing units each containing one hydrophone and three orthogonally oriented geophones inside the cable, distributing their weight for optimal coupling to the seafloor. This design was an improvement over the older ocean bottom cables. Other seabed seismic cable designs comprise separate support and signal cables, which help to acoustically decouple the sensors from the support cable. The function of support cable and seismic cable are sometime included in a single construction during the manufacture of the cable, and signal leads in this type of cable may be exposed and connected to sensors units.

No matter what design of the seismic seabed cable, they are subject to instability in the presence of strong water currents at or just above the seafloor. Tidal currents, river currents, strong underwater streams, and bad weather (waves) are but a few examples. Water currents induce vibrations that may be transmitted to the sensors. The noise level on the sensors may increase, which may degrade data quality and may actually stop data acquisition. Furthermore, the coupling of the sensor housing to the seafloor may become poor and inconsistent, which may degrade data quality. Also, any significant cable movement may require repositioning of the cable, losing time and may require picking up and re-deploying the cable. Prior solutions have focused on increasing the weight of the cables, but there are serious drawbacks to that approach. Good coupling of sensor housings to the seabed is optimized by a larger weight contrast between the cable and the housings so that there is minimal cable interference. However, heavily weighted cables may translate to higher tension during deployment and retrieval, unless the deployment or retrieval vessel speed is closely matched to the cable deployment rate, limiting efficiency and requiring much stricter mechanical specifications for the cables.

Fairing is a well-known technique to reduce drag of cables being pulled or deployed through water and to avoid "strumming", a term of art used to describe the action of currents on a cable. Fairing may provide other advantages: it gives mechanical protection to the cable against cuts, wear and abrasion. Fairing has not been used to increase stability of a seismic cable laying at the seafloor. Known seabed seismic cables have no provision for fluid to pas between the cable and the seabed. Sensor housings are known that are attached to the cable, and some have exterior cleats or other members promoting adherence to the seabed, but the cable itself is still able to move about and rotate. From the above it is evident that there is a need in the art for improvement in seismic seabed cables, and in reducing the effects of strong currents thereon.

SUMMARY OF THE INVENTION

In accordance with the present invention, seabed seismic cables and methods of stabilizing them are described. Apparatus and methods of the invention reduce or overcome problems with previous apparatus and methods, and may be used to collect marine seismic data, including but not limited to 3-D and 4-D marine seismic data.

A first aspect of the invention is an apparatus comprising:

(a) a seabed seismic cable;

(b) a plurality of fairing elements on the cable.

Apparatus in accordance with the invention may include a plurality of sensor units, which may be inside the cable body, or the sensor units may comprise sensor elements within housings, the housings fastened to the cable. In either case the sensor units may be spaced along the cable. The fairing elements may be adapted to extend at least transversely from the cable as water flows past the cable, and may be constructed so that they do not significantly increase the cable's profile, viewed either transversely or in cross-section. The fairing elements may be sufficient in number and position to reduce the effective turbulence of water flowing past the cable, but insufficient to induce torsion on the cable body as water flows past the cable. The fairing elements may be fastened to the cable by any method, such as adhesives, screws, rivets, brackets, latches, sewing or stitching, or they may be integral with the cable, in the sense that they are made during the process of making the cable. The elements may comprise multiple strands of material, which may be natural, synthetic, composite, or combination thereof, and they may be made of the same material as the cable outer skin, or of different material. The elements may be braided materials, and they may be spiral wound onto the cable. The elements may comprise strips of materials, having a length to width ratio of at least 10 or higher. The length and width of the strips may be the same or different from strip to strip. The strips may have a cross-section selected from square, rectangular, triangular, circular, conical section, oval, and may be the same or different from strip to strip. The cross-section may decrease from an end near the cable to an end distal from the cable. The cable may be modular in construction. The faired cable may have an external surface shaped to allow fluid to pass generally transverse to the cable body and between the cable and the seabed, which may improve flow of water past the cable. The external surface shaped to allow fluid to pass may comprise a plurality of channels or other passages, which may be formed in the cable itself or in a sleeve attached to the cable, and which may be substantially straight channels or tortuous paths. The external surface of faired cables of the invention may also comprise one or more members that improve crossline contact between the cable and the seabed, with or without the external surface being shaped to allow passage of fluid between the cable and the seabed. Apparatus of the invention also include seabed seismic cables either with or without fairing and with or without external shape promoting passage of fluid between the cable and the seabed, but including only one or more members that improve crossline contact between the cable and the seabed.

A second aspect of the invention is a method comprising:
(a) acquiring seismic data using a seabed seismic data cable positioned on a seabed; and
(b) controlling effect of fluid flow on the cable during data acquisition using fairing elements on the cable.

Methods of the invention include those wherein the controlling of fluid flow effects includes controlling lift force on the cable using fairing elements that are caused to extend from the cable generally transversely as fluid flows past the cable, and methods wherein the torsional forces on the cable are controlled. Not only may the effects of fluid flow past the cable be controlled using the elements, the actual fluid flow may be controlled to a certain extent by providing an external surface of the cable shaped to allow fluid to pass between the cable and the seabed, such as by provision of flow channels or grooves in the cable, for example by providing flow channels in the cable body, or in an attachment to the cable body, such as a sleeve. In yet other methods of the invention, the seismic data is acquired using cables of the invention, either with or without fairing and with or without external shape promoting passage of fluid between the cable and the seabed, but including only one or more members that improve crossline contact between the cable and the seabed.

Apparatus and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes seismic seabed cables and methods of using same to reduce the effects of water flowing past the cables during swift current events. Certain cables of the invention include elements that shed vortices, reduce drag, and reduce lifting forces on the cable. Other cables of the invention include members that promote stability of the cables in the crossline direction, while yet other cables of the invention have exterior shapes allowing fluids to pass between the cable and the seabed. Finally, seabed seismic cables of the invention include those wherein a combination of two or more of these features is employed. While the terms "seabed" and "seafloor" are used herein, it will be understood by those of ordinary skill in the art that the invention is not limited to use of seismic cables on seabeds or seafloors, but the apparatus and methods may be used in all types of water and liquids and all types of terra firma permanently or temporarily under water or other liquid (such as water/oil mixtures, emulsions, chemicals, and the like), including but not limited to fresh water, oceans, seas, transition zones, tidal zones, lagoons, lakes, rivers, bays, gulfs, channels, inlets, fjords, lochs, streams, marshes, creeks, indeed anywhere shear wave seismic data is desired and where the cable may be affected by a flowing current.

Figure 1:
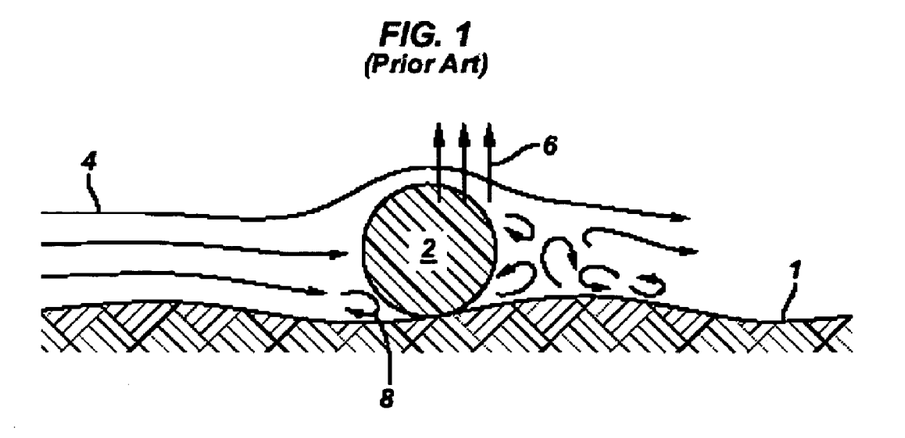
FIG. 1 is a schematic cross-section of a prior art seabed seismic cable, illustrating some of the problems that can occur when water flows past the cable.

In strong current situations, the strongest force applied to the cable may be the lift force because of non-laminar flow behind the cable, as depicted schematically in FIG. 1 for a prior art seabed seismic cable 2. The non-laminar flow 4 over cable 2 lying on seabed 1 causes both a force caused by disturbed flow 8 trying to push the cable out of position, and a force 6 (Bernoulli lifting force) trying to lift the cable from the seafloor. The disturbed flow 8 at the bottom of the cable near the impact zone with the oncoming current may cause vibration of cable 2, which is undesirable since it creates noise in signals picked up by sensors (not shown) within cable 2. Furthermore, frequently, but not always, the current increases further away from seafloor 1, so that upon initial lifting, cable 2 will experience an even greater lift force due to the even stronger current, and any increase in cable height above seafloor 1 may significantly worsen its stability. As may be seen, cable 2 is frequently subject to instability in the presence of strong water currents at or just above the seafloor. Tidal currents, river currents, strong underwater streams, and bad weather (waves) are but a few examples. Water currents induce vibrations that may be transmitted to the sensors. The noise level on the sensors may increase, which may degrade data quality and may actually stop data acquisition. Furthermore, the coupling of the sensor housing to the seafloor may become poor and inconsistent, which may degrade data quality. Also, any significant cable movement may require repositioning of the cable, losing time and may require picking up and re-deploying the cable.

Figure 2:
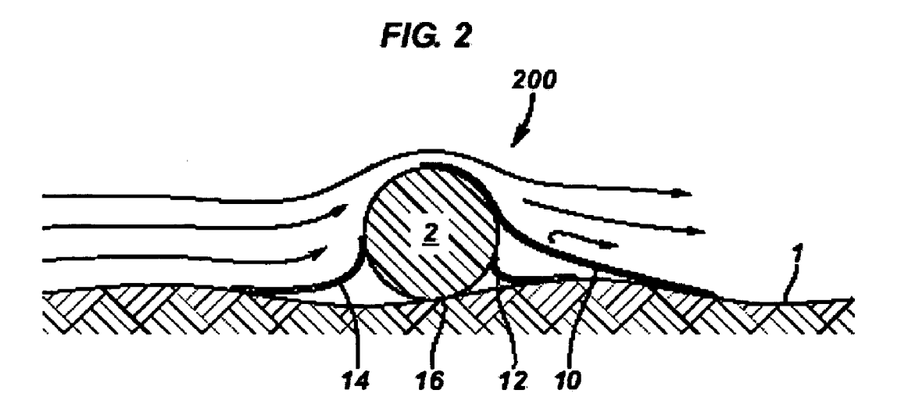
FIG. 2 is a schematic cross-sectional view of one embodiment of the invention.
Figure 3:
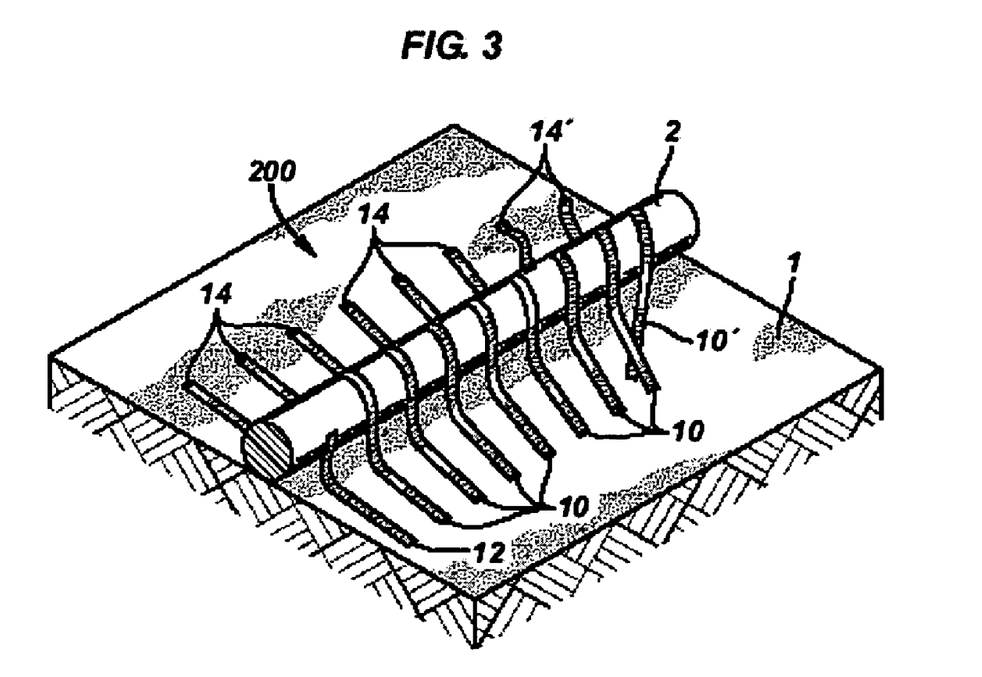
FIG. 3-5 are schematic perspective views of three other embodiments of the invention.

The invention provides several solutions to improve the stability of seabed seismic cables in the presence of water currents at the seafloor, without significantly increasing their weight. Referring to FIGS. 2 and 3, illustrating one embodiment 200 of the present invention, certain apparatus and methods of the invention reduce or overcome problems with previous apparatus and methods by providing elements 10 that are capable of extending generally transversely of cable 2 under the influence of water flow when the current reaches a certain magnitude, thus altering significantly the flow pattern around the cable. This will allow operation of such cables in areas with strong current and may improve the quality of the recorded data, as less vibration will be transmitted to the sensors inside cable 2. The mechanical properties of the cable are not changed significantly in a way that could impact the quality of the data recorded by the seabed seismic system. Elements 10, 12, and 14 may be referred to as "fairing elements", or collectively as "fairing", and may be attached to cable 2 at several points around the circumference of the cable, or may be a part of the cable. Fairing elements 10 function to improve the flow of water without impacting the cable mechanical properties. By fairing is meant an auxiliary structure or the external surface of a cable itself that serves to reduce drag. There are different types of fairing. One useful type is hairy fairing, which does not introduce significant cable torsion, orients itself in the right direction, and has marginal impact on the cable diameter and storage volume. Fairing elements may also comprise strips of material, having length much greater than their width and thickness, and this type is illustrated in FIG. 2. Fairing elements 10 orient with the current, and will therefore not try to rotate the cable. Fairing elements 10, 12, and 14 may be made very flexible and thin, so as to have only a marginal impact on the cable diameter, and will tend to make the flow of fluid over the cable more laminar. Fairing elements 14 may also help diminish the turbulence in front of cable 2, and may therefore reduce or prevent the pushing force mentioned earlier. Fairing elements 10, 12, and 14 may be attached to cable 2 in three direction 120 degrees apart, as depicted, so that the apparatus is able to influence the flow past the cable efficiently no matter how the cable is oriented. Full 360 degree fairing could also be used, or any angle between fairing elements for that matter.

As noted in FIG. 3 it is not necessary that all elements extend perfectly under the influence of the current in order to substantially fulfill their intended function. For example, element 10' has been moved to a position under its neighboring element 10 due to some reason, for example perhaps cable 2 was pulled slightly along the seabed. Elements 14' are not laying perfectly on the seabed. However, as long as a significant number of elements are able to extend as elements 10, the main function of the elements will be fulfilled.

Figure 4:
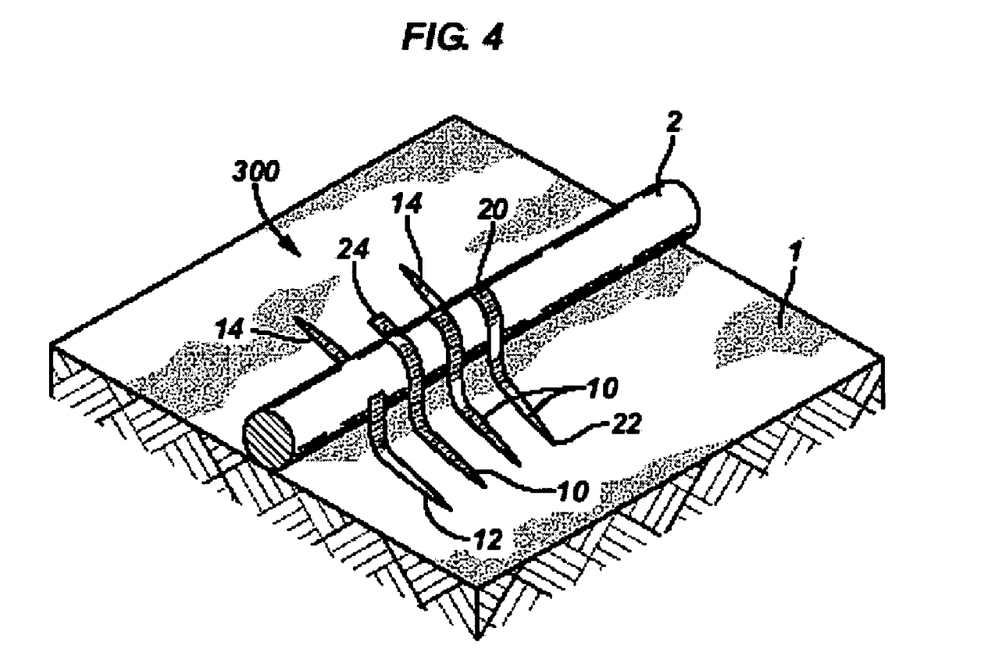
Figure 5:
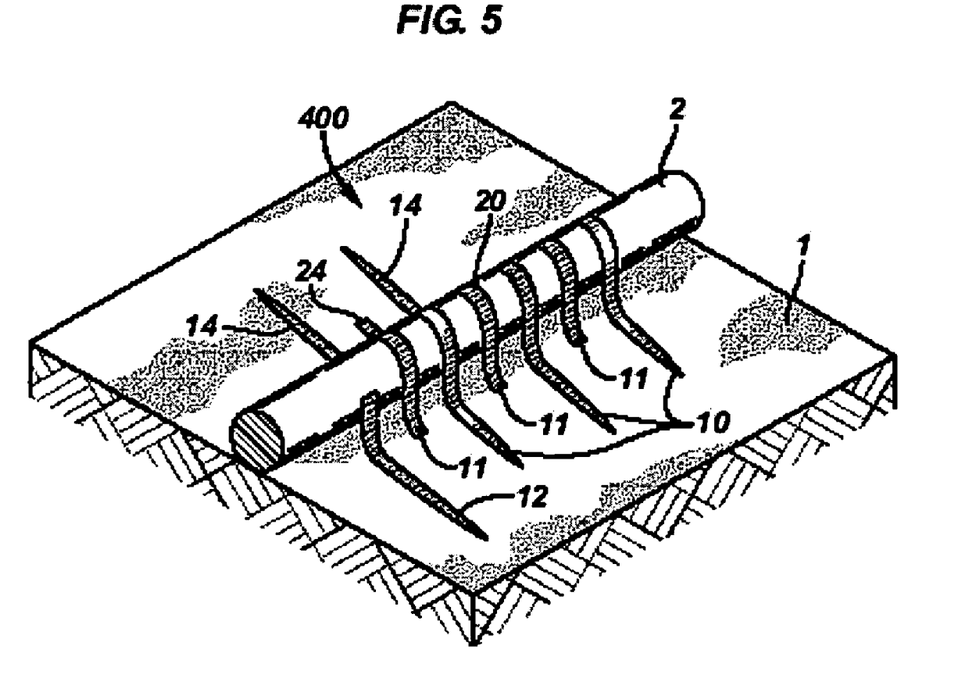

FIGS. 4 and 5 illustrate further optional features of apparatus and methods of the invention in embodiments 300 and 400, respectively. Referring to embodiment 300 in FIG. 4, note that elements 10 may be wider at an end 20 attached to cable 2, and their width may decrease gradually until reaching pointed ends 22 distal from cable 2. This feature may increase the streamline effect of the elements, and also allows a greater portion of their weight to be near cable 2, which will help weigh down cable 2. Another option is that the elements need not all be the same in shape or length. Element 24 is depicted as sorter than its neighboring elements 14, and has a non-pointed tip distal from cable 2. Embodiment 400 of FIG. 5 illustrates alternating long and short elements 10 and 11, respectively, which may decrease the tendency of some elements to overlap, as previously indicated by element 10' in FIG. 3.

Figure 6:
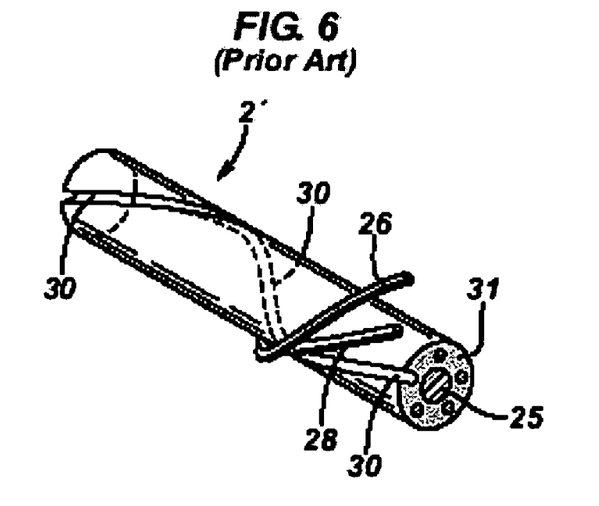
FIG. 6 is a schematic perspective view of another prior art seabed seismic cable.
Figure 7:
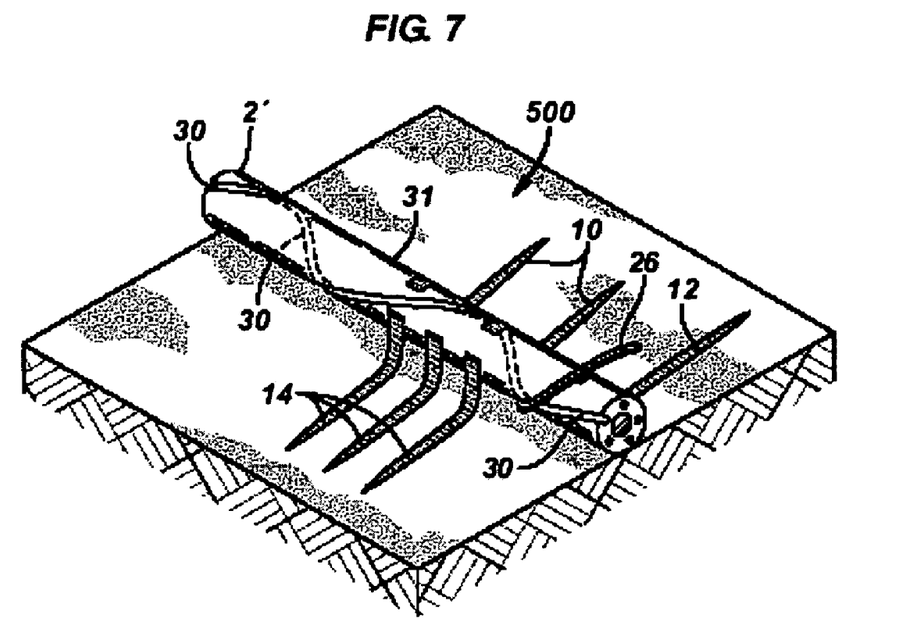
FIG. 7 is a schematic perspective view of the cable of FIG. 6 modified in accordance with the present invention.

Another prior art seabed seismic cable is illustrated schematically in perspective in FIG. 6. Cable 2' comprises a support cable 25 and a signal cable 28 enclosed within a protective cover material 31. Signal cable 28 is combined within support cable 25 at the time of manufacture, in helical fashion as illustrated. A ripcord 26 may be used to expose portion of signal cable 28, leaving a helical channel or groove 30 in support cable 25. One embodiment if this invention is to add channels or grooves in the cable to allow flow of water under the cable. This may be accomplished in any number of ways, one way being depicted in FIG. 7, which illustrates embodiment 500, a modified version of the cable of FIG. 6 having elements 10, 12, and 14 as in prior embodiments, but also including a helical flow channel 30. By providing an alternate passage for fluid to flow below the cable (helical groove or channel 30), the fluid flow above the cable may be reduced, reducing the uplift and drag. Other channels may be used, such as circular channels extending all the way around the circumference of cable 2' and generally parallel to elements 10, as described in reference to FIG. 8. Other channel configurations may be envisioned by those of ordinary skill in the art, and are considered within the present invention.

Figure 8:
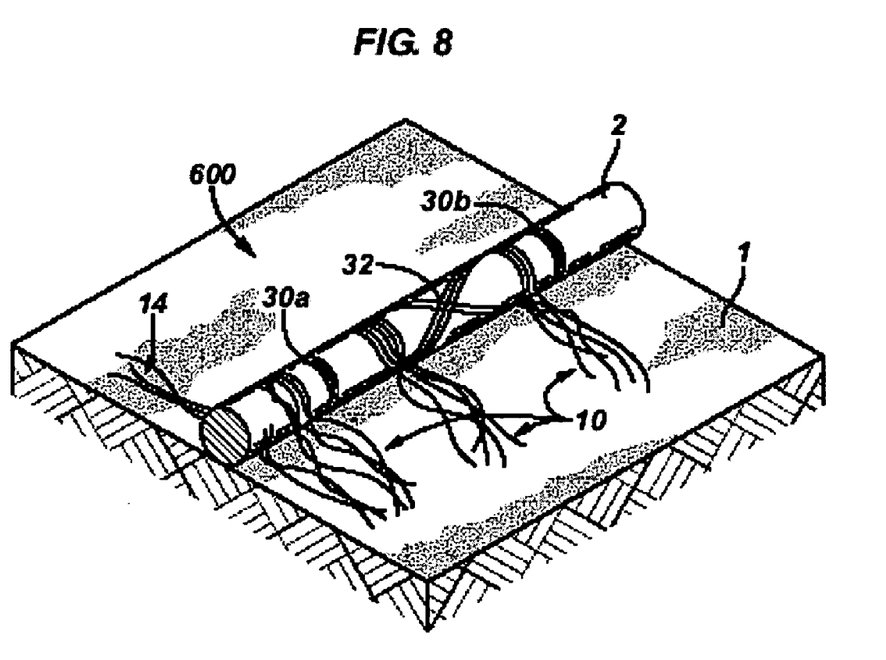
FIG. 8 is a schematic perspective view of another embodiment of the invention.

FIG. 8 illustrates an embodiment 600 of a hairy fairing useful in the invention. In this embodiment elements 10 and 14 are illustrated as undulating strands of material, which may flap up, down and all around under strong current, much like strands of string in a strong wind, or the tail of a kite. Strands 10 and 14 may be attached separately, after manufacture of cable 2, or they may be loosened from the skin of cable 2, which might be a braided material as indicated at 32. Cable 2 may have circular grooves or channels 30$a$ and 30$b$ in the cable skin, or in a sleeve around the cable skin. Alternatively, channels 30$a$ and 30$b$ may be part of a helical groove, as previously described in reference to FIG. 7.

Figure 9:
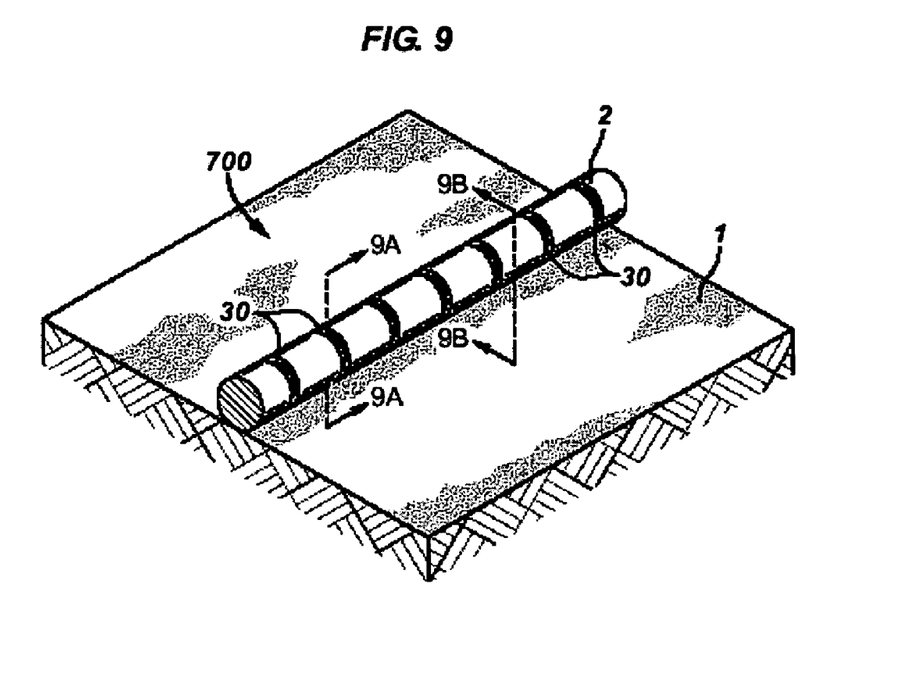
FIGS. 9-13 illustrate various seabed cable embodiments in accordance with the invention.
Figure 9A:
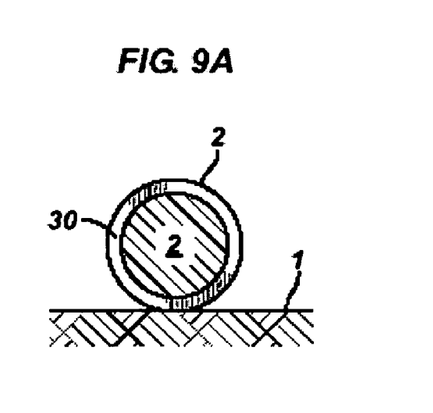
Figure 9B:
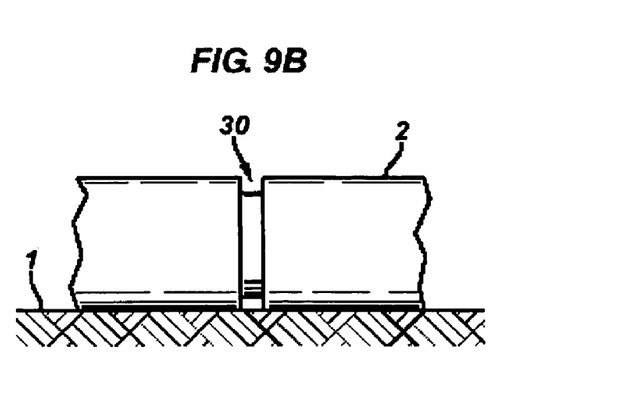

FIGS. 9, 9A, and 9B illustrate another embodiment 700 of the invention. FIG. 9 illustrates a seabed cable 2 having an exterior surface shape that defines, in this embodiment, a plurality of shaped channels 30 formed in cable 2 in the crossline (y) direction. Channels 30 of this embodiment are more easily viewed in FIGS. 9A and 9B, where the former is a cross-section taken along the line "9A-9A" of FIG. 9, and FIG. 9B is a side elevation view. It may be seen that the exterior shape of cable 2, including channels 30 creates multiple paths for fluid to travel between cable 2 and seabed 1 substantially in the crossline direction. The width and depth of channels 30 or other shape perturbations may be uniform or non-uniform from channel to channel, and channels 30 may be spaced uniformly or non-uniformly along cable 2 in the inline, or (x) direction. Furthermore, channels 30 need not extend the entire circumference around cable 2. Channels 30 are not limited to any particular shape, cross-section, length, width, depth, or volume.

Figure 10:
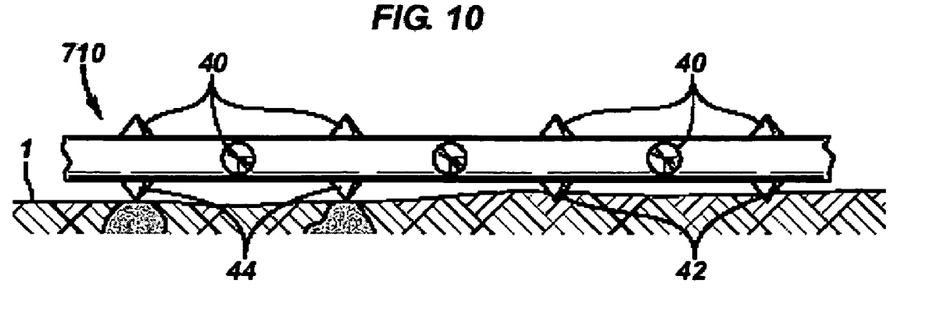
Figure 11:
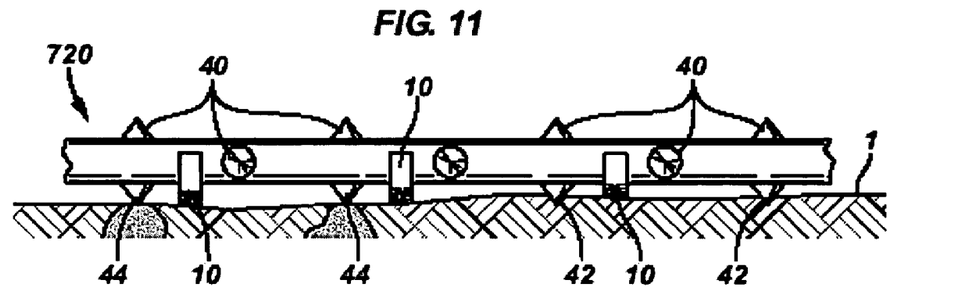
Figure 12:
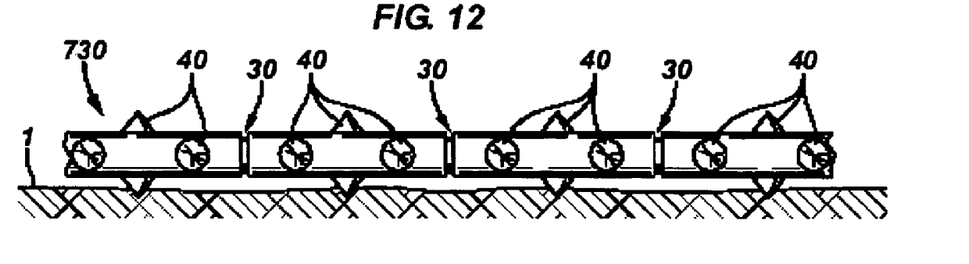
Figure 13:
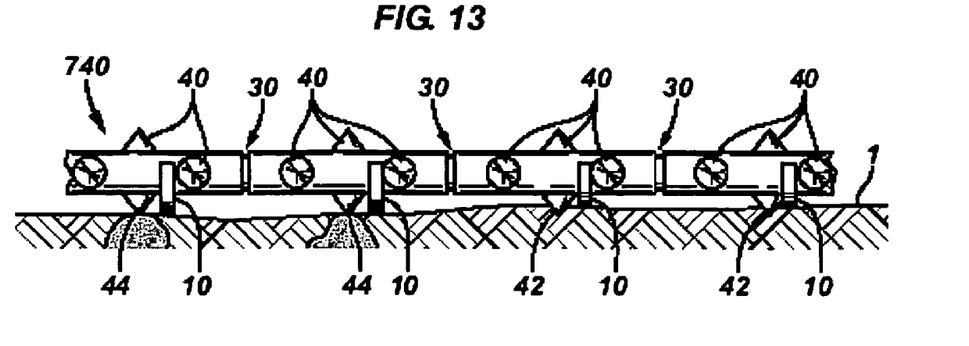

FIGS. 10, 11, 12, and 13 illustrate side elevation views of four other seabed cable embodiments of the invention. FIG. 10 illustrates embodiment 710 comprising a cable 2 having members 40, shown here as pointed cones. Other possible shapes for members 40 include pyramids, such as 3-sided or 4-sided pyramids, although the shape is not limited to any of these shapes, and more than one shape may be used on any cable, or similar shapes but having a variety of sizes may be used. Members 42 are illustrated as digging into seabed 1, while other members 44 are shown as being on a substantially impervious portion of seabed 1, perhaps a rocky outcropping. In this embodiment, members 40, 42, and 44 have a double function of providing channels between members 44 and between members 42, and substantially reducing rolling and translational movement of cable 2 on seabed 1 in the crossline direction. FIG. 11 illustrates embodiment 720 comprising the same features as embodiment 710, but adding fairing elements 10. Embodiment 720 thus exhibits the vortex shedding function, as well as providing channels between cable 2 and seabed 1 and the motion reducing function of members 40, 42 and 44. FIG. 12 illustrates another seabed seismic cable embodiment 730, which combines the type of channels discussed in reference to FIGS. 9, 9A, and 9B, with members 40, 42, and 44 of FIGS. 10 and 11. This embodiment may ensure there is a channel between members 42 and 44 even in the event that members 42 and 44 are completely dug into seabed 1. Embodiment 740 of FIG. 13 adds fairing elements and their function to embodiment 730 of FIG. 12. It should be noted that in the embodiments discussed in reference to FIGS. 10, 11, 12, and 13, and indeed all embodiments and figures of the present invention, geophone housings are not depicted, but would typically be spaced along each seabed cable. U.S. Pat. No. 6,288,972 discloses a cleated housing for a seismic sensor, the housing attached to the seabed cable. Cleated sensor housings may be used in conjunction with any apparatus or method of the present invention.

Other than the inventive features discussed herein, seabed seismic sensors and their support cables (herein referred to collectively as seabed seismic cables) useful in the invention include those described in the article "Shear Waves Shine Brightly", Oilfield Review, pages 2-15 (1999), and typically comprise an instrumented cable packed with receivers, similar to the streamers that are towed in conventional marine surveys, but designed to operate on the seafloor. One seabed seismic cable, known under the trade designation "NESSIE 4C", contains multiple sensing units each containing one hydrophone and three orthogonally oriented geophones inside the cable, distributing their weight for optimal coupling to the seafloor. Each cable may house hundreds of four-component sensors. Full particle-motion vector recording of all P (pressure) and S (shear) wavefronts may be achieved, along with the pressure wavefront familiar from towed streamers. This design was an improvement over conventional ocean bottom cables, which may be employed in the present invention as well, comprising only a hydrophone and a vertically oriented geophone strapped to the outside; however, this arrangement is incapable of recording the full particle-motion vector and may not couple adequately to the seafloor. Published Patent Cooperation Treaty application no. WO 02/14905 A1, published Feb. 21, 2002, assigned to WesternGeco LLC, Houston, Tex. describes a seabed sensor unit and support cable that may have improve coupling to the seabed. The sensor unit comprises a one or more sensing elements disposed within a protective housing having a flat base. A flat base ensures that there is an adequate contact area between the sensor housing and the earth's surface, so that there is good acoustic coupling to the sensing element(s) mounted within the sensor housing. The housing is attached to a support cable. Furthermore, the dimensions of the base of the housing may be chosen so that the extent of the base in a direction parallel to the cable is similar to the extent of the base in a direction perpendicular to the cable, which may minimize the dependence of the acoustic coupling to the sensor housing, and thus to sensing elements within the housing, on the angle between the incident seismic energy and the cable.

Another seabed cable useful in the invention is described (except for the inventive concepts described herein) in U.S. Pat. No. 6,021,091, also assigned to WesternGeco, LLC, which describes an elongated ocean-bottom seismic cable section of a desired length manufactured by assembling a stress member in combination with a plurality of signal communication channels. A plurality of receiver clusters is fastened to the assembly at desired intervals. Each cluster includes at least two multi-axial, gimbal-supported seismic receivers that are symmetrically mounted about the axis of the cable assembly. Output signals from the common axes of the respective multi-axis receivers of each cluster are coupled with each other through a suitable filter and linked to corresponding signal communication channels. The cable section is terminated by connectors for providing mechanical and communication linkage to other sections and eventually to signal-processing instrumentation.

The fairing elements may be manufactured during the manufacture of the cable, or added afterwards. Methods of making cables having fairing elements, such as braided hair faired cables, are not the subject of the invention, these methods being known from publications such as U.S. Pat. Nos. 3,440,991; 3,975,980, and 4,756,270 These publications discuss the benefits of fairing of towed cables, but do not suggest faired seabed cables and methods of using same to acquire shear wave data as in the present invention. Desired properties of the fairing elements include the ability to shed vortices, reduce drag, and reduce lift force on the seabed cable. The cable may be water tight, armored, and carry sufficient number of wires or optical fibers to carry acoustic data from the sensors in the cable to a data collection unit. Methods of making cables having protruding members, such as member 40, 42, and 44 in FIGS. 10-13 are also known. The cables of the invention may have a minimum working strength of 4000 pounds and minimum breaking strength of 8000 pounds, and may have separate electrical (or fiber optic) and mechanical terminations to provide strain relief for electrical (or fiber optic) connectors and to enable the electrical or optical connectors to be connected and disconnected while maintaining a working strength tension. The cables may be faired along their whole length, or only portions of their length. The fairing may be 4 or more times the cable diameter. If hairy fairing is used, the cable may have a braided jacket with fiber "hairs" adapted to extend form the cable, and the fairing elements may vary in length and density. The elements can be single, double, four-sided, or any number of sided versions. The buoyancy of the fairing elements should be such that the elements lie on the cable and/or seabed when there is slow current, and are able to extend substantially perpendicular to the cable under the influence of strong current, especially those elements at or near the top of the cable as it lies on the seabed. Those elements that are on the upstream side may be tucked under the cable and prevent the disturbances discussed earlier (see for example element 14 in FIG. 2).

The cable outer skin, fairing elements, and members 40, 42, and 44 may be made of any natural or synthetic material. Useful synthetic materials include thermoplastic elastomers, such as polyurethane thermoplastic elastomers, polyester thermoplastic elastomers, and ionomeric thermoplastic elastomers. The synthetic materials may have additives therein which reduce or prevent fouling of these elements. Thermoplastic elastomers are defined and reviewed in Thermoplastic Elastomers, A Comprehensive Review, edited by N. R. Legge, G. Holden and H. E. Schroeder, Hanser Publishers, New York, 1987. Thermoplastic elastomers (as defined by Legge et al. and used herein) are generally the reaction product of a low equivalent weight polyfunctional monomer and a high equivalent weight polyfunctional monomer, wherein the low equivalent weight polyfunctional monomer is capable on polymerization of forming a hard segment (and, in conjunction with other hard segments, crystalline hard regions or domains) and the high equivalent weight polyfunctional monomer is capable on polymerization of producing soft, flexible chains connecting the hard regions or domains. "Thermoplastic elastomers" differ from "thermoplastics" and "elastomers" (a generic term for substances emulating natural rubber in that they stretch under tension, have a high tensile strength, retract rapidly, and substantially recover their original dimensions) in that thermoplastic elastomers, upon heating above the melting temperature of the hard regions, form a homogeneous melt which can be processed by thermoplastic techniques (unlike elastomers), such as injection molding, extrusion, blow molding, and the like. Subsequent cooling leads again to segregation of hard and soft regions resulting in a material having elastomeric properties, however, which does not occur with thermoplastics. Some commercially available thermoplastic elastomers include segmented polyester thermoplastic elastomers, segmented polyurethane thermoplastic elastomers, segmented polyurethane thermoplastic elastomers blended with other thermoplastic materials, segmented polyamide thermoplastic elastomers, and ionomeric thermoplastic elastomers.

The seabed seismic cables of the invention may also have advantages when the cable is in the water column during deployment in that they may experience less drag and vibration, may be easier to position the cable at pre-plot location, and may produce less noise on the seismic channels during deployment, making it easier to run acoustic positioning during deployment to help achieve accurate positioning of the seabed cable. Other advantages include the cable can withstand higher currents before it starts moving. This will allow seismic acquisition in areas or period of time (tides) where it would not have been possible. It will limit the need for cable relaying and repositioning. Cables of the invention may provide better coupling of the cable to the seafloor, resulting in better data quality, and less noise from current on the seismic channels, as there will be less turbulence around the cable. The fairing elements may also help protect the cable against abrasion and cuts in case of dragging on the seafloor, particularly when thermoplastic elastomers are used for cable outer skin, members 40, 42, and 44, and fairing elements. The fairing may also be beneficial for the parts of the cable that might not be in contact with the seafloor (some parts may be hanging because of seafloor topography, or hanging at the end of a sensor housing). The fairing then serves its function of reducing drag and strumming.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. A faired seabed seismic cable comprising:
   (a) a cable having an exterior surface, the cable comprising a stress member in combination with one or more signal communication channels, and a plurality of seismic receiver units selected from the group consisting of:
      i) receiver clusters fastened to the cable at desired intervals, each cluster including at least two multi-axial, gimbal-supported seismic receivers symmetrically mounted about the axis of the cable; and
      ii) receiver housings comprising connecting means for connecting the housing to the cable, and a base that is substantially flat and having a maximum extent parallel to the cable substantially equal to a maximum extent perpendicular to the cable; and
   (b) a plurality of fairing elements on the cable, each comprising flexible strips of material having length much greater than their width and thickness, each having a first and distal ends, each able to extend transversely of the cable under influence of a flowing current from a previously limp, non-extended relaxed position and orient themselves with the current, altering flow patterns around the cable, making the flow patterns more laminar.

2. The faired seabed seismic cable of claim 1 wherein the first ends of the fairing elements are attached to the cable exterior surface.

3. The faired seabed seismic cable of claim 1 wherein the first ends of the faking elements are integral with the cable exterior surface.

4. The faired seabed seismic cable of claim 1 wherein the material is selected from natural and synthetic materials.

5. The faired seabed seismic cable of claim 4 wherein the fairing elements are spiral wound onto the cable.

6. The faired seabed seismic cable of claim 1 wherein the length, width, and thickness of the strips of material is the same from strip to strip.

7. The faired seabed seismic cable of claim 1 wherein the connecting means for connecting the housing to the cable allow relative movement between the housing and the cable.

* * * * *